United States Patent
Mestre

(10) Patent No.: US 6,999,915 B2
(45) Date of Patent: Feb. 14, 2006

(54) PROCESS AND DEVICE FOR TRANSLATION EXPRESSED IN TWO DIFFERENT PHONETIC FORMS

(76) Inventor: Pierre Mestre, Domaine de Verchant, Castelnau-le-Lez (FR) F-34170

( * ) Notice: Subject to any disclaimer, the term of this patent is extended or adjusted under 35 U.S.C. 154(b) by 776 days.

(21) Appl. No.: 09/973,060

(22) Filed: Oct. 10, 2001

(65) Prior Publication Data

US 2002/0198700 A1   Dec. 26, 2002

(30) Foreign Application Priority Data

Jun. 22, 2001   (FR) .................................. 01 08713

(51) Int. Cl.
  *G06F 17/20*   (2006.01)
(52) U.S. Cl. .............................. 704/2; 704/277; 704/10
(58) Field of Classification Search .................... 704/2, 704/10, 231, 243, 277; 434/157, 169
  See application file for complete search history.

(56) References Cited

U.S. PATENT DOCUMENTS

| | | | | |
|---|---|---|---|---|
| 4,443,199 A | * | 4/1984 | Sakai .......................... | 434/170 |
| 4,852,170 A | * | 7/1989 | Bordeaux .................... | 704/277 |
| 5,333,275 A | * | 7/1994 | Wheatley et al. ........... | 704/243 |
| 5,713,739 A | * | 2/1998 | Yu .............................. | 434/157 |
| 5,782,640 A | * | 7/1998 | Sandlin ....................... | 434/157 |
| 5,850,627 A | * | 12/1998 | Gould et al. ................ | 704/231 |

FOREIGN PATENT DOCUMENTS

JP       WO 8200442      *  2/1982

* cited by examiner

*Primary Examiner*—Tãlivaldis Ivars Šmits
*Assistant Examiner*—Abdelali Serrou
(74) *Attorney, Agent, or Firm*—Young & Thompson

(57) ABSTRACT

The present invention relates to a process and a device for translation of words and/or expressions from at least one language of origin into at least one destination language, in which, for each word or expression in at least one language of origin, and for each destination language, are provided simultaneously at least:
  a first phonetic writing of the translation of said word or of said expression into said destination language, and
  a second phonetic writing of said translation of said word or of said expression into said destination language, said second phonetic writing being different from said first phonetic writing.

19 Claims, 3 Drawing Sheets

PROCESS AND DEVICE FOR TRANSLATION EXPRESSED IN TWO DIFFERENT PHONETIC FORMS

FILED OF THE INVENTION

The present invention relates to a process and a device for translation. It is applicable particularly to books, software and on-line sites.

BACKGROUND OF THE INVENTION

Dictionaries, software and sites known at present permit the utilizer to select a word, an expression or a phrase in a language of origin and to read its translation in a language of destination.

A first problem arises because phonetic writing of the expression in the language of destination, which is sometimes provided, is either in the international phonetic writing code API, which is illegible for the general public, or in the form of phonetic writing that approximates the language of origin, which limits the reading in the language of destination to the sounds which can be read in the language of origin. For example, the sounds "eu" or "on" pronounced in French, cannot be transcribed phonetically in English.

A second problem relates to the countries where several languages are used, for which the dictionaries known at present do not offer translation into several destination languages without turning the page. Similarly, when several languages of origin can be used by several users, several dictionaries are necessary at present.

The invention has discovered that there is need to select one or more expressions from an assembly of contextual expressions (which is to say to be able to use conjointly in a given circumstance, for example in a hotel or a nightclub). The inventor has also discovered the need to visualize at least two phonetic writings of the translation in the language of destination. The inventor has also discovered that there is a need to visualize on the same page, the translations of the same word or the same expression in at least two languages. The inventor has also discovered that there is need to select conjointly an assembly of words and/or of expressions in the language of origin and a destination language to visualize, on the same page, the translations, in the destination language of all the words and/or expressions of said assembly. The inventor has also discovered that there is a need to visualize simultaneously at least two languages of origin for the same expression.

SUMMARY OF THE INVENTION

According to a first aspect, the present invention provides a process for the translation of words and/or expressions from at least one language of origin into at least one destination language, in which process, for each word or expression in at least one language of origin, and for each destination language, are provided simultaneously at least:
  a first phonetic writing of the translation of said word or said expression into said destination language, and
  a second phonetic writing of said translation of said word or said expression into said destination language, said second phonetic writing being different from said first phonetic writing.

Thanks to these arrangements, the user, who knows, even approximately, the pronunciation of at least two languages, can find, by recovery, the pronunciation of the word or the expression in the destination language.

It should here be noted that the invention does not relate to a presentation of information, in which the form of the presentation of information will be different, but relates to a method of phonetic translation, based on writing, which is more effective than what existed in the prior art and which gives the technical result that the user controls better the pronunciation of the words and expressions translated, without having to learn the international phonetic alphabet API.

Conjointly with its first aspect, the present invention provides a book of translation of the words and/or expressions of at least one language of origin into at least one destination language, which book supplies, for each word or expression in at least one language or origin, and for each destination language, on the same page or on two successive pages of which the first has a numerical pair, at least:
  a first phonetic writing of the translation of said word or said expression into the destination language, and
  a second phonetic writing of said translation of said word or said expression into said destination language, said second phonetic writing being different from said first phonetic writing.

Conjointly with its first aspect, the present invention provides a translation site for words and/or expressions of at least one language of origin into at least one destination language, which site supplies, for each word or expression in at least one language of origin, and for each destination language, on the same page, at least:
  a first phonetic writing of the translation of said word or said expression into said destination language, and
  a second phonetic writing of said translation of said word or said expression into said destination language, said second phonetic writing being different from said first phonetic writing.

Conjointly with its first aspect, the present invention provides translation software for words and/or expressions of at least one language of origin into at least one destination language, which software supplies, for each word or expression in at least one language of origin, and for each destination language, simultaneously, at least:
  a first phonetic writing of the translation of said word or said expression into said destination language, and
  a second phonetic writing of said translation of said word or said expression into said destination language, said second phonetic writing being different from said first phonetic writing,
of translation, characterized in that, for each word or expression in the language of origin, it supplies, on the same reading screen as said word or said expression in the language of origin, at least two phonetic writings of its translation into the destination language.

Conjointly with the first aspect of the present invention, the latter provides an information support for translation of words and/or expressions from at least one language of origin and into at least one destination language, which support preserves, for each word or expression in at least one language of origin, and for each destination language, simultaneously at least:
  a first phonetic writing of the translation of said word or said expression into said destination language, and
  a second phonetic writing of said translation of said word or said expression into said destination language, said second phonetic writing being different from said first phonetic writing.

Conjointly with the first aspect of the present invention, the latter provides an information support for translation of words and/or expressions from at least one language of origin into at least one destination language, which information support preserves instructions of a program which supplies simultaneously, for each word or expression in at least one language of origin, and for each destination language, at least:

a first phonetic writing of the translation of said word or said expression into said destination language, and a second phonetic writing of said translation of said word or said expression into said destination language, said second phonetic writing being different from said first phonetic writing.

Conjointly with its first aspect, the present invention provides a translation device for words and/or expressions from at least one language of origin into at least one destination language, comprising a written information support, which displays simultaneously, for each word or expression in at least one language of origin, and for each destination language, at least:

a first phonetic writing of the translation of said word or said expression into said destination language, and a second phonetic writing of said translation of said word or said expression into said destination language, said second phonetic writing being different from said first phonetic writing.

According to a first preferred embodiment, the phonetic writings of the translation into the destination language of the word or expression in the language of origin, comprise on the one hand a phonetic writing in the language of origin and, on the other hand, in English. According to another example, the phonetic writings of the translation in the destination language of the word or of the expression in the language of origin, comprise on the one hand a phonetic writing in the language of origin and, on the other hand, an international phonetic writing. According to another example, the phonetic writings of the translation into the destination language of the word or expression in the language of origin, comprise on the one hand an international phonetic writing and, on the other hand, a phonetic writing in English. According to another example, the phonetic writings of the translation in the destination language of the word or of the expression in the language of origin, comprise on the one hand a phonetic writing in the language of origin, and, on the other hand, in English, and, still further, in international phonetic writing.

According to particular characteristics, the process briefly set forth above comprises, on the same page, in the language of origin, an assembly of words and/or expressions relative to the same situation in which the user can find himself.

According to particular characteristics, the process briefly set forth above provides, for each word or expression in the language of origin, a translation into at least two languages on the same page.

According to particular characteristics, the process briefly set forth above comprises a selection means for an assembly of words and/or expressions in a language of origin, a means for selecting a destination language, and an operation of placing facing each other the assembly of the words and/or expressions in the language of origin and a page comprising the translations in the destination language of all the words and expressions in the language of origin.

According to particular characteristics, the process briefly described above comprises, for each word or expression, on the same page, its translation into at least three languages.

According to a second aspect, the present invention provides a process for translation characterized in that it comprises, on the same page, in the language of origin, an assembly of words and/or expressions relative to the same situation in which the user finds himself.

Thanks to these arrangements, a user who finds himself in a given situation, visualizes simultaneously the words and/or expressions which can be useful to him and does not need manipulation between the successive uses of these words and/or expressions.

According to particular characteristics of the process briefly set forth above, it provides, for each word or expression in the language of origin, simultaneously at least two phonetic writings of its translation into the destination language.

According to particular characteristics, the process briefly set forth above provides, for each word or expression in the language of origin, a translation into at least two languages on the same page.

According to particular characteristics, the process briefly set forth above comprises selection means for an assembly of word and/or expressions in a language of origin, selection means for a destination language, and an operation of placing facing each other the assembly of words and/or expressions in the language of origin and a page comprising the translations in the destination language of all the words or expressions in the language of origin.

According to particular characteristics, the process briefly set forth above comprises, for each word or expression, on the same page, its translation into at least three languages.

According to a third aspect, the present invention provides a process for translation, characterized in that it provides, for each word or expression in the language of origin, a translation into at least two languages on the same page.

Thanks to these arrangements, the user can select, without changing the page, in which destination language he wishes to express himself.

According to particular characteristics, the process briefly set forth above comprises, on the same page, in the language of origin, an assembly of words and/or expressions relating to the same situation in which the user finds himself.

According to particular characteristics, the process briefly set forth above provides, for each word or expression in the language of origin, simultaneously at least two phonetic writings of its translation into the destination language.

According to particular characteristics, the process briefly set forth above comprises selection means for an assembly of words and/or expressions in a language of origin, selection means of a destination language, and an operation of placing facing each other the assembly of words and/or expressions in the language of origin and a page comprising the translations into the destination language of all the words and the expressions in the language of origin.

According to particular characteristics, the process briefly set forth above comprises, for each word or expression, on the same page, its translation into at least three languages.

According to a fourth aspect, the present invention provides a process for translation, characterized in that it comprises selection means for an assembly of words and/or expressions in a language of origin, selection means of a destination language, and an operation of placing facing each other the assembly of words and/or expressions in the language of origin and a page comprising the translation into the destination language, of all the words and expressions in the language of origin.

Thanks to these arrangements, the user can select, without intermediate manipulation, a succession of words and/or expressions to express himself in the destination language.

According to particular characteristics, the process briefly set forth above comprises, on the same page, in the language of origin, an assembly of words and/or expressions relative to the same situation in which the user finds himself.

According to particular characteristics, the process briefly set forth above provides, for each word or expression in the language of origin, simultaneously at least two phonetic writings of its translation into the destination language.

According to particular characteristics, the process briefly set forth above provides, for each word or expression in the language of origin, a translation into at least two languages on the same page.

According to particular characteristics, the process briefly set forth above comprises, for each word or expression, on the same page, its translation into at least three languages.

According to a fifth aspect, the present invention provides a process for translation, characterized in that it comprises, for each word or expression, on the same page, its translation into at least three languages.

Thanks to these arrangements, users mastering different languages can use the same pages.

According to particular characteristics, the process briefly set forth above comprises, on the same page, in the language of origin, an assembly of words and/or expressions relating to the same situation in which the user can find himself.

According to particular characteristics, the process briefly set forth above provides, for each word or expression in the language of origin, simultaneously at least two phonetic writings of its translation into the destination language.

According to particular characteristics, the process briefly set forth above provides, for each word or expression in the language of origin, a translation into at least two languages on the same page.

According to particular characteristics, the process briefly set forth above comprises selection means for an assembly of words and/or expressions in a language of origin, selection means of a destination language, and an operation of placing facing each other the assembly of the words and/or expressions in the language of origin, and a page comprising the translations into the destination language of all the words and expressions in the language of origin.

Each of the aspects of the present invention is applicable equally well to a translation book, a computer site, for example connected to the Internet, to translation software, to a data support, for example a compact disc, or a diskette containing program instructions and/or data permitting the use of the present invention as briefly set forth above.

Other advantages, objects and characteristics of the present invention will become apparent from a reading of the description which follows, given by way of explanation and in no way limiting, with respect to the accompanying drawings, in which:

DETAILED DESCRIPTION OF THE INVENTION

In all the description, there is meant by a page, an assembly of data which are viewed simultaneously by a user. Thus, two pages facing each other in the same book constitute, in the sense of the present invention, the same page. These pages can be, according to exemplary embodiments, in a same book or displayed on a screen of an electronic device, for example a computer that is portable or not or an electronic translator.

In all the description, there will be referred to as a phonetic writing in a language, a writing which permits a reader whose knows that language, to pronounce a word or an expression in another language. For example, phonetic writing in English of the French word "chaise" is "shase". The phonetic writing in the international phonetic alphabet ("API") is also a phonetic writing in the sense of the present invention.

Figure 1:
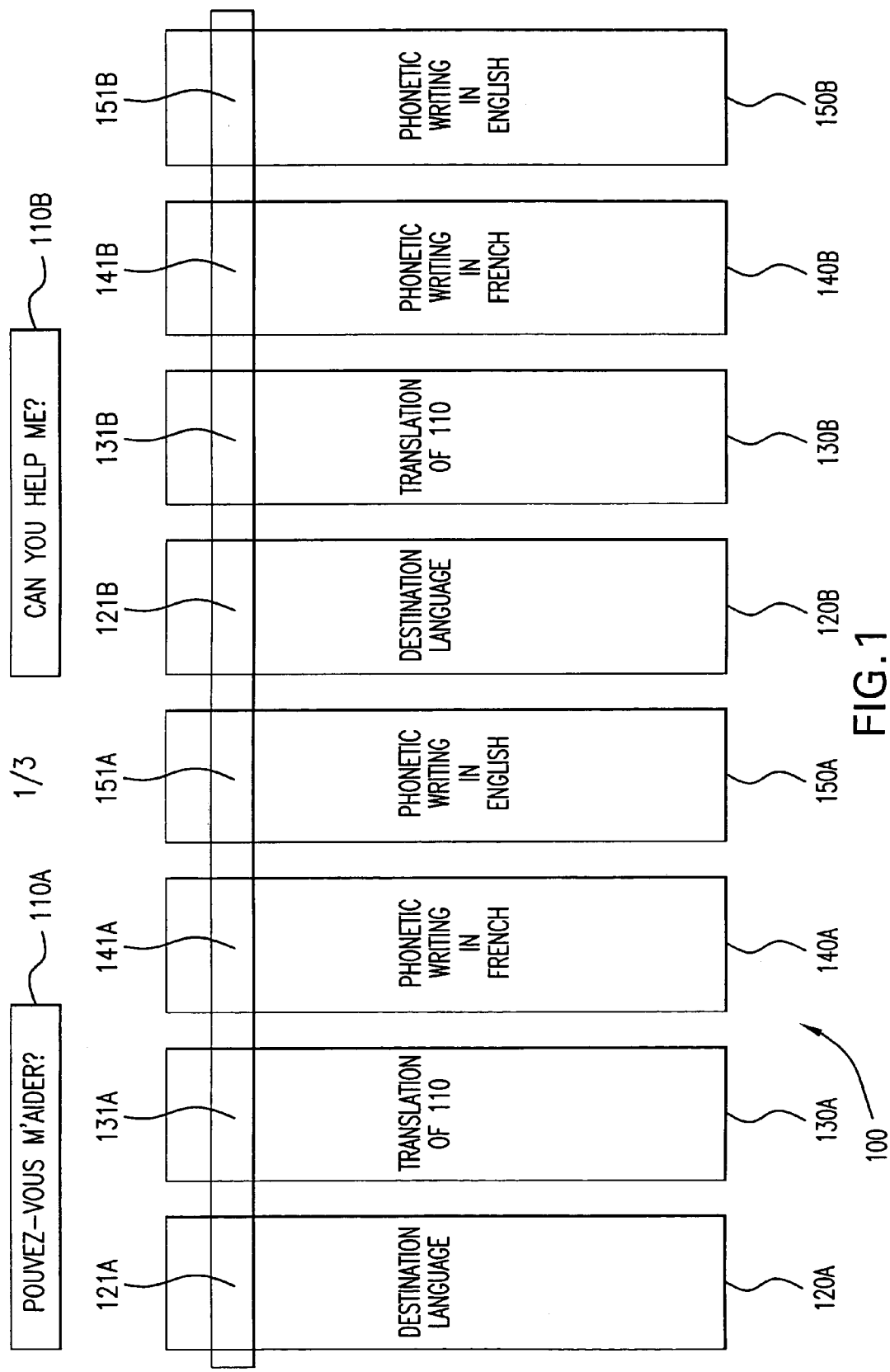
FIG. 1 represents a page provided by the practice of one aspect of the present invention.

In FIG. 1 is shown a page 100 which can for example be in a book, displayed by software or displayed at a site on-line, for example on the Internet, according to one aspect of the present invention. The page 100 comprises a heading 110 indicating a word or an expression in at least one language of origin, French in this case, portion 110A of the heading, and English, portion 110B of the heading. The page 100 also comprises, two columns 120A and 120B in which are located, on each line, an indication of the destination language, in the respective cases noted, 121A and 121B, two columns 130A and 130B in which are located, on each one, the writing of the translation of the expression indicated in the heading 110 in the language corresponding to the language indication indicated in the case, respectively 121A and 121B, of the same line in column 120A and 120B, in the respective cases denoted 131A and 131B, two columns 140A and 140B in which are located, on each line, the phonetic writing in French of the translations present in cases 131A and 131B, in the respective cases denoted 141A and 141B, two columns 150A and 150B in which are located, on each line, the phonetic writing in English of the translations present in the cases 131A and 131B, in the cases respectively denoted 151A and 151B.

Thus, the user sees, on the same line, and in the order left to right, the indication of the destination language, case 121A, the written translation of the expression disposed in the heading in the destination language, case 131A, the phonetic writing in French of this translation in the destination language, case 141A, and the phonetic writing in English of this translation in the destination language, case 151A.

According to modifications, what the page 100 presents is divided into two pages facing each other, the heading 110A and the columns 120A, 130A, 140A and 150A being located on the left page and the heading 110B and the columns 120B, 130B, 140B and 150B being located on a right hand page.

According to modifications, one of the phonetic writings is according to the international phonetic alphabet ("API") or another phonetic transcription. Thus the phonetic writings used can be:

in API and in English,
in the language of origin and in English,
in the language of origin, in English and in API,
in the language of origin and in English,
in API, in English and in French,
in English and in Spanish,
in API, in English and in Spanish,
in API and in Spanish.

In the embodiments shown in FIG. 1:

the process and device for translation provide simultaneously at least two phonetic writings of its translation in at least one destination language;

the translation process and device provide for each word or expression in at least one language of origin, a translation into at least two languages on the same page.

Figure 2:
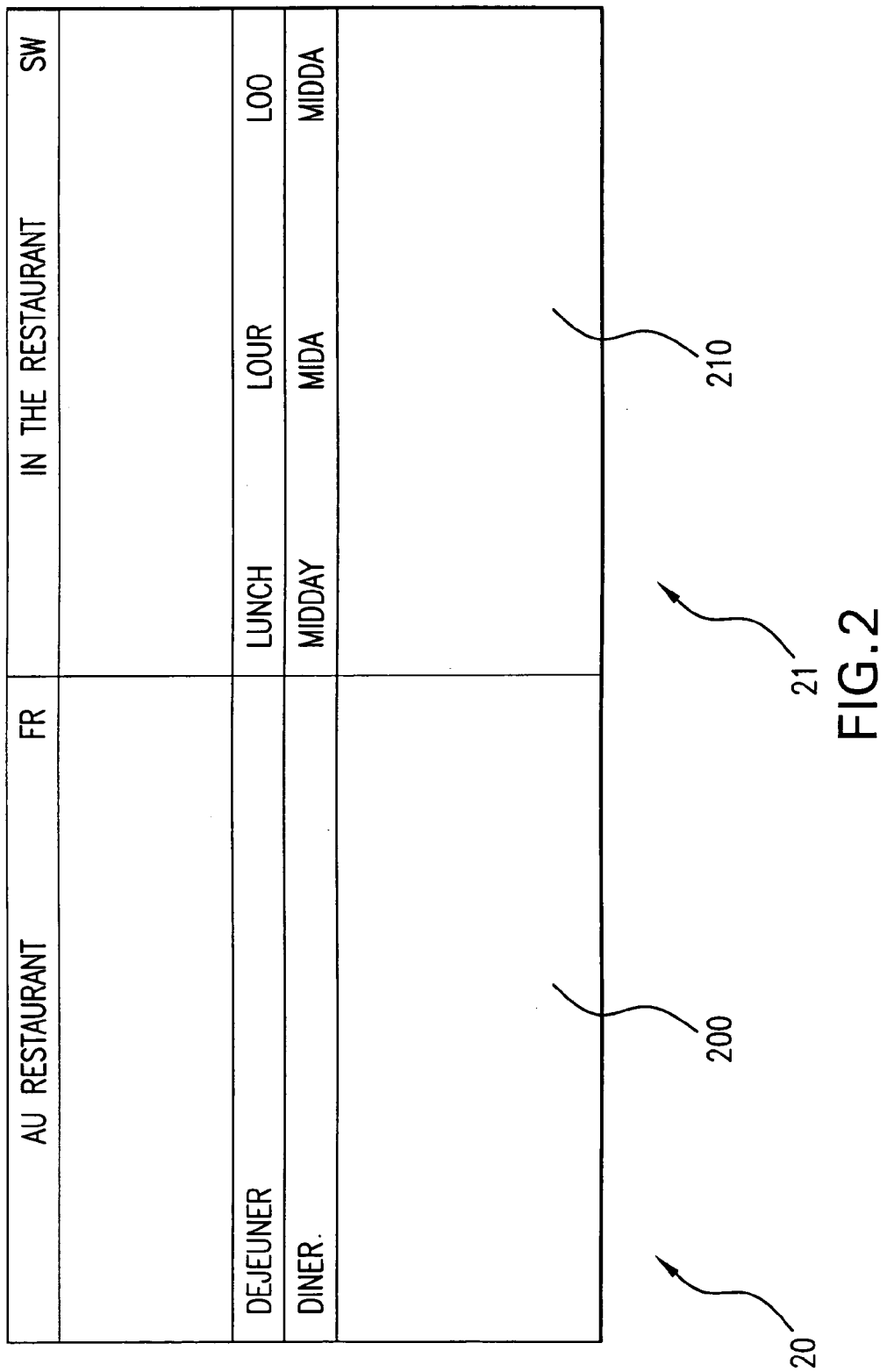
FIG. 2 shows facing pages obtained by the practice of one aspect of the present invention.

In FIG. 2 are shown pages or portions of pages 200 and 210 which can be for example facing each other in a book, the two pages having successive numerals of which the first is even, displayed simultaneously by software or displayed simultaneously at an on-line site, for example on the Internet, according to one aspect of the present invention. The pages 200 and 210 are in two groups of pages 20 and 21, respectively, which can be selected separately but which are automatically placed facing each other.

For example, the group of pages 20 and the group 21 are mounted, in parallel, on a hinge (which would be horizontal and bordering pages 200 and 210, in FIG. 2) such that the pages of group 20 pivot on the same axis as the pages of group 21, but without the rotation of a page of group 20 blocking the rotation of a page of group 21. According to another example, the group of pages 20 and the group of pages 21 are connected in the same connection (for example on the right of page 210 in FIG. 2) but the pages of the group 20 can fold to disclose the portions of pages, such as page 200.

Page 200 comprises, for a particular language, a series of words and/or expressions relating to at least one situation in which the user can find himself (at the hotel, ordering transportation, in a nightclub, in a store, small talk and civilities, current words, presentations, travel, at the restaurant, at a celebration, culture/plays, at the bank, at the post office, time and date, in the street/directions, emergencies, sports and leisure.)

Other pages or groups of pages 20 comprise, either for other particular languages, or for other situations, other series of words or expressions.

Similarly, for the pages of group 21, given that if more than two languages are used, the languages and the situations of the groups of page 20 and 21 are covered.

Thus, according to one example, the group 20 comprises, in French, pages corresponding each to an assembly of situations and in English, pages corresponding each to an assembly of situations of the group 21 comprising, in English, pages each corresponding to an assembly of situations and, in Spanish, pages corresponding each to an assembly of situations. In this example, the selection of the proper pages permits carrying out translations between French and English, between English and Spanish and between French and Spanish. In exemplary embodiments, the languages of the groups of page 20 and 21 are identical.

The words and expressions of pages 200 and 210 which are translations of each other face each other between pages 200 and 210.

It should be noted that a color code or a thumb index can be used to easily locate the situations and languages relative to the pages. Preferably, each page of the group 21 comprises simultaneously at least two phonetic writings of its translation into the language represented in page 210.

In the embodiments shown in FIG. 2:

for each word or expression in at least one language of origin, the process and device provide simultaneously at least two phonetic writings of its translation into at least one destination language;

the process and the device provide, on the same page, in at least one language of origin, an assembly of words and/or expressions relative to the same situation in which the user may find himself and their translations into at least one destination language;

the process and the device comprise an operation for selection of an assembly of words and/or expressions in at least one language of origin, an operation of selection of at least one destination language, and an operation of placing facing each other the assembly of the words and/or expressions in each language of origin and a page comprising the translations into the destination language, of all the words and expressions.

Figure 3:
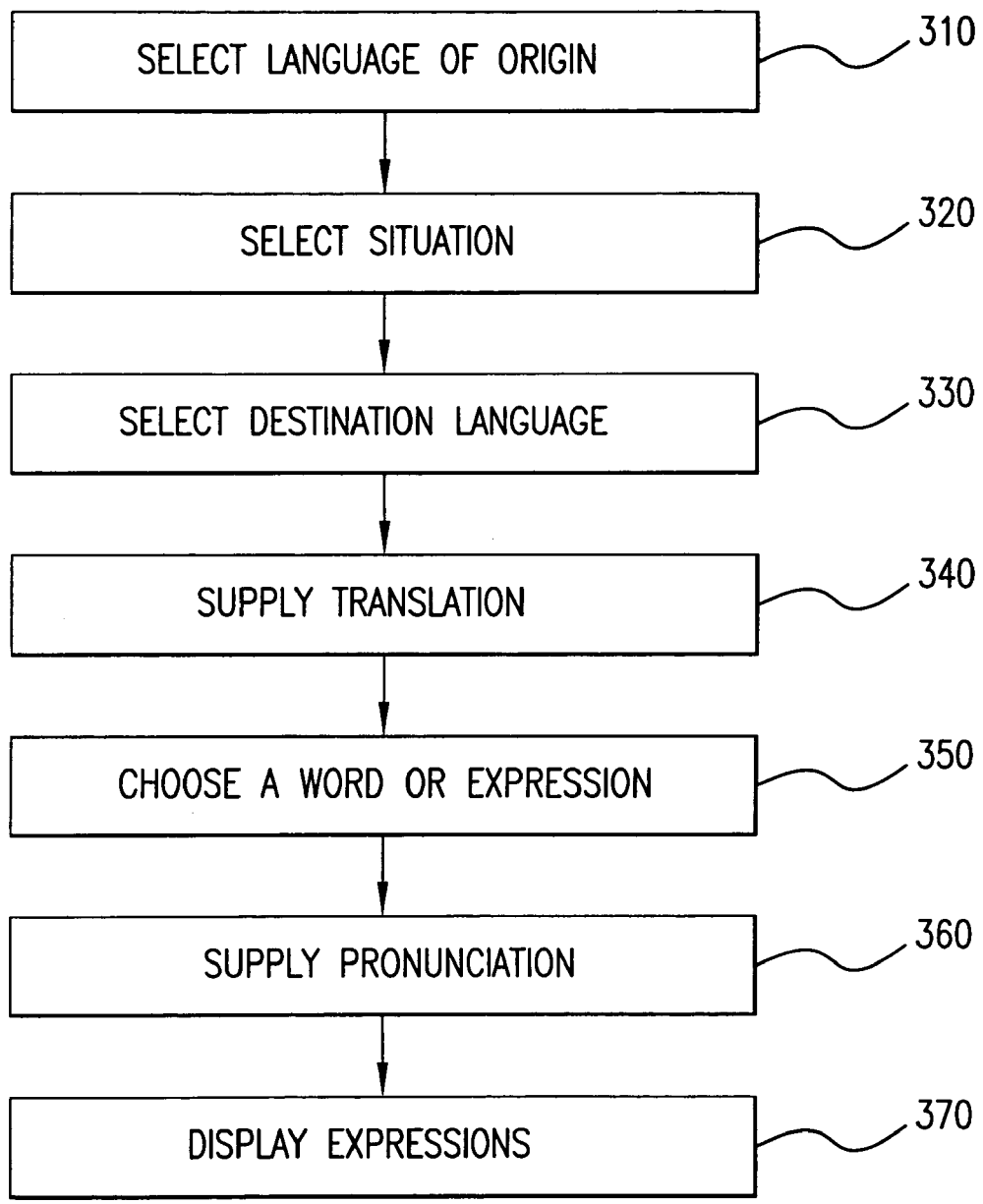
FIG. 3 shows a sequence of operations practiced according to one aspect of the present invention.

In FIG. 3 are shown operations performed by software, for example recorded on an information support of the compact disc or diskette type, or on an on-line site, for example on the Internet. In the course of an operation 310, the user selects a language of origin. In the course of an operation 320, the user selects a situation (for example from the situations described with respect to FIG. 2), among the situations described in the language of origin. In the course of an operation 330, the user selects a destination language. In the course of an operation 340, the software or the site accesses a database, for example recorded on the same information support as the software or the site, and provides information written in the destination language of the words and/or expression relative to the situation selected in the course of operation 320.

Preferably, the software or the site also supplies at least two phonetic writings of said words, for example in the language of origin, in English, and/or in API. As a modification, the user selects, in the course of an operation (not shown), the phonetic writings he wishes to have and the software or the site follows this choice.

In the course of an operation 350, the user selects one of the words or one of the expressions. In the course of an operation 360, the software or the site provides the pronunciation of the selected word or expression, for example, by means of a sound display.

In the course of an operation 370, the software or the site displays, in the language of origin, other words and/or expressions which are related to the word or expression selected, even if these words and/or expressions are not in the list supplied in the course of operation 340.

What is claimed is:

1. Process for the translation of words and/or expressions from at least one language of origin, into at least one destination language, in which process, for each word or expression in at least one language of origin, and for each destination language, are supplied simultaneously at least:

a first phonetic writing of the translation of said word or said expression into said destination language, and a second phonetic writing of said translation of said word or said expression into said destination language, said second phonetic writing being different from said first phonetic writing.

2. Process according to claim 1, in which are provided, on the same page, in at least one language of origin, an assembly of words and/or expressions relating to the same situation in which the user may find himself and, for each word or expression, its translation into at least one destination language.

3. Process according to claim 1, in which is provided on the same page, for each word or expression in at least one language of origin, a translation into at least two different languages.

4. Process according to claim 1, said process comprising an operation of selecting an assembly of words and/or expressions in at least one language of origin, an operation of selecting at least one destination language, and an operation of placing facing each other the assembly of words and/or expressions in each language of origin, and a page comprising a translation in each destination language, of all the words and expressions.

5. Process according to claim 1, in which is provided on the same page, for each word or expression, its translation into at least two destination languages.

6. Process according to claim 1, in which one of the first and second phonetic writings of the translation of said word or said expression into said destination language, is in English.

7. Process according to claim 1, in which one of the first and second phonetic writings of the translation of said word or said expression into said destination language, is in a language of origin of said word or of said expression.

8. Process according to claim 1, in which one of the first and second phonetic writings of the translation of said word or said expression into said destination language, is in the international phonetic alphabet.

9. Process according to claim 1, in which one of the first and second phonetic writings of the translation of said word or said expression into said destination language, is in Spanish.

10. Device for translating words and/or expressions from at least one language of origin into at least one destination language, comprising a written information support, which displays simultaneously, for each word or expression in at least one language of origin, and for each destination language, at least:
    a first phonetic writing of the translation of said word or said expression into said destination language, and
    a second phonetic writing of said translation of said word or of said expression into said destination language, said second phonetic writing being different from said first phonetic writing.

11. Device according to claim 10, in which the information support provides, on the same page, in at least one language of origin, an assembly of words and/or expressions relating to the same situation in which the user may find himself, and their translations into at least one destination language.

12. Device according to claim 10, in which the information support provides, on the same page, for each word or expression in at least one language of origin, a translation into at least two languages.

13. Device according to claim 10, characterized in that it comprises at least a selection means of an assembly of words and/or expressions in at least one language of origin, a selection means of at least one destination language, and means for placing facing each other the assembly of words and/or expressions in each language of origin, at a page comprising the translation in each destination language, of all the words and expressions in the language of origin.

14. Device according to claim 10, in which the information support provides, for each word or expression, on the same page, the translation of said word or said expression into at least two destination languages.

15. Device according to claim 10, in which one of the first and second phonetic writings of the translation of said word or of said expression into said destination language, is in English.

16. Device according to claim 10, in which one of the first and second phonetic writings of the translation of said word or of said expression into said destination language, is in the language of origin of said word or of said expression.

17. Device according to claim 10, in which one of the first and second phonetic writings of the translation of said word or of said expression into said destination language, is in the international phonetic alphabet.

18. Device according to claim 10, in which one of the first and second phonetic writings of the translation of said word or of said expression into said destination language, is in Spanish.

19. A book for translating words and/or expressions from at least one language of origin into at least one destination language, which book provides, for each word or expression in at least one language of origin, and for each destination language, on the same page or on two successive pages of which the first has an even numeral, at least:
    a first phonetic writing of the translation of said word or of said expression into said destination language, and
    a second phonetic writing of said translation of said word or of said expression into said destination language, said second phonetic writing being different from said first phonetic writing.

\* \* \* \* \*